US012757148B2

(12) United States Patent
Masal et al.

(10) Patent No.: US 12,757,148 B2
(45) Date of Patent: Oct. 6, 2026

(54) METHODS OF DETERMINING POSITION OF A TARGET NODE IN SIDE-LINK COMMUNICATION SYSTEM

(71) Applicants: Centre of Excellence in Wireless Technology, Taramani (IN); Indian Institute of Technology Madras (IIT Madras), Chennai (IN)

(72) Inventors: Abhijeet Abhimanyu Masal, Taramani (IN); Vikram Singh, Taramani (IN); Sayyed Shafivulla, Taramani (IN); Pavan Kalyan Devarakonda, Taramani (IN); Jeniston Deviraj Klutto Milleth, Taramani (IN); Bhaskar Ramamurthi, Adyar (IN)

(73) Assignees: Centre of Excellence in Wireless Technology, Tamil Nadu (IN); Indian Institute of Technology Madras (IIT Madras), Tamil Nadu (IN)

( * ) Notice: Subject to any disclaimer, the term of this patent is extended or adjusted under 35 U.S.C. 154(b) by 309 days.

(21) Appl. No.: 18/233,098

(22) Filed: Aug. 11, 2023

(65) Prior Publication Data

US 2024/0089893 A1 Mar. 14, 2024

(30) Foreign Application Priority Data

Aug. 12, 2022 (IN) ............................. 202241046185

(51) Int. Cl.

| | |
|---|---|
| ***H04W 64/00*** | (2009.01) |
| ***H04L 5/00*** | (2006.01) |
| ***H04W 16/28*** | (2009.01) |
| ***H04W 72/25*** | (2023.01) |

(52) U.S. Cl.

CPC ........... *H04W 64/00* (2013.01); *H04L 5/0051* (2013.01); *H04W 16/28* (2013.01); *H04W 72/25* (2023.01)

(58) Field of Classification Search

CPC ... H04W 64/00; H04W 64/003; H04W 16/28; H04W 72/25; H04W 72/40; H04L 5/0051

See application file for complete search history.

(56) References Cited

U.S. PATENT DOCUMENTS

| | | | | |
|---|---|---|---|---|
| 2022/0365163 | A1* | 11/2022 | Baek | H04W 56/00 |
| 2023/0006790 | A1* | 1/2023 | Manolakos | H04L 27/261 |
| 2023/0012712 | A1* | 1/2023 | Michalopoulos | G01S 5/0289 |
| 2023/0199699 | A1* | 6/2023 | Gulati | G01S 5/0289 455/456.1 |
| 2023/0232429 | A1* | 7/2023 | Farag | H04L 5/0051 370/252 |

(Continued)

*Primary Examiner* — Siu M Lee

(74) *Attorney, Agent, or Firm* — Wan Chieh Lee; Haug Partners LLP

(57) ABSTRACT

The present invention relates to a method of positioning a target node (102-4) in a side-link communication system in a wireless communication network (100). The method comprises establishing, by a first node (102-6), a communication link with a second node (102-1 to 102-3) and a third node (102-4). The first node (102-6) measures a relative Angle of Arrival (AoA) and a relative Angle of Departure (AoD) of the third node (102-4) with respect to the second node. The target node is one of the first node, the second node and the third node. The first node (102-6) estimates a position of the third node (102-4) based on at least one of the relative AoA and the relative AoD.

24 Claims, 11 Drawing Sheets

(56) References Cited

U.S. PATENT DOCUMENTS

| | | | | |
|---|---|---|---|---|
| 2023/0296753 | A1 * | 9/2023 | Khlat | G01S 13/765<br>342/125 |
| 2024/0215054 | A1 * | 6/2024 | Haustein | H04W 4/20 |
| 2024/0364473 | A1 * | 10/2024 | Yoon | H04W 24/10 |
| 2025/0106878 | A1 * | 3/2025 | Kumar | H04W 72/56 |
| 2025/0167865 | A1 * | 5/2025 | Barbu | H04W 24/10 |

* cited by examiner

METHODS OF DETERMINING POSITION OF A TARGET NODE IN SIDE-LINK COMMUNICATION SYSTEM

CROSS-REFERENCE TO RELATED APPLICATION(S)

This application claims priority under 35 U.S.C. § 119(a) to Indian Patent Application No. IN202241046185, filed Aug. 12, 2022, the entirety of which is herein incorporated by reference.

FIELD OF THE INVENTION

The present invention relates to cellular wireless communication systems, and more particularly to sidelink positioning in a cellular network.

BACKGROUND OF THE INVENTION 5G technology supports a large number of verticals including side-link communication which includes Vehicle-to-Vehicle (V2V) communication, Vehicle-to-Everything (V2X) communication, etc. To enhance the performance of side-link communication, positioning support plays a vital role, due to its wide range of business applications. Emergency call positioning emerges as an important use case due to regulatory requirements from the Federal Communications Commission (FCC). Many other critical services may rely on positioning with much stricter requirements on accuracy, time to first fix, and latency. Third generation partnership project (3GPP), as well as other standard-bearing organizations, have focused on providing an accurate positioning measurement of User Equipment (UE). 3GPP technology, such as Long-Term Evolution (LTE), LTE-Advanced, and 5G/New Radio (NR) place increased importance on the sub-meter positioning accuracy of the UE. Increasing the positioning accuracy of a UE helps is protecting Vulnerable Road Users (VRUs), such as pedestrians, wheelchairs, and cyclists from vehicles, specifically autonomously driving vehicles. Protection of VRUs may require accurate side-link positioning when a UE is not connected to Base Stations (BSs) or required network coverage is not available.

In 5G system, positioning may be supported as a service, and methods such as, DL-Time Difference Of Arrival (DL-TDOA), enhanced cell-ID (E-CID), Observed Time Difference of Arrival (OTDOA), Uplink Angle of Arrival (UL-AoA), Uplink Relative Time of Arrival (UL-RTOA), Uplink Time Difference of Arrival (UL-TDOA), Multi-Round Trip Time (M-RTT), etc. are generally utilized. Further, in 5G system, architecture enhancement for positioning support and special positioning-related protocols such as, LTE Positioning Protocol (LPP), NR Positioning Protocol Annex (NRPPa), and LTE Positioning Protocol Annex (LPPa) have been introduced.

In 5G/LTE, the positioning of a target UE is triggered based on the request made to a Location Management Function (LMF) server present in a Core Network (CN) and interfaced with the Next Generation Radio Access Network (NG-RAN) via. Access and mobility Management Function (AMF). This request may be generated by one of the networks, a target UE, or any external agent. LMF interacts with AMF and NG-RAN via standard interfaces NLs and NRPPa (-Nls-NG-CA respectively. The server terminates at the UE through LPP protocol, which is transparent to NGRAN. The NRPPa and LPP enable the exchange of necessary information elements between NG-RAN, the UE, and the server, respectively. The 5G positioning architecture allows positioning of a target UE based on NG-eNB via LPP (RRC) protocol for NSA mode. The UE and NG-RAN perform measurements with respect to each other over NR-Uu and LTE-Uu for gNB-TRPs and ng-eNB-TPs in NSA and SA modes, respectively.

For DL-based positioning, the LMF may provide configurations to the NG-RAN for transmission (or broadcasting) of reference signals and to target UE for measuring the reference signals. Similarly, for UL-based positioning, the LMF may provide resource configurations to the target UE for transmission (or broadcasting) of reference signals and to NG-RAN for measuring the reference signals. The resource configurations may be provided to the transmitter to indicate the parameters for generation and transmission of reference signals (RS), repetition/periodicity of RS resource sets, transmission filters, and transmission frequency bands, etc. The resource configurations for the receiver may contain RS-IDs, measurement windows, measurement gaps, frequency bands, receive filters, etc.

Side-link link positioning may be visualized as co-operative localization. In the co-operative localization paradigm, nodes may include master nodes such as, a BS, a relay node, a Non-terrestrial BS, and slave nodes such as, UE, V2X UEs, etc. Such nodes assists each other for improving coverage and positioning with improved accuracy. In 5G system, more than one BS (also termed as gNB, eNB, etc.) may be configured to perform one of the measurements mentioned in Table 1. Table 1 illustrates various methods supported by release-16 standards in 5G-NR. The LMF may collect all measurements from all the BSs to estimate most accurate positioning of a UE.

TABLE 1

| Methods | UE Measurements | RAN measurements | LMF |
|---|---|---|---|
| ULTDoA | — | RSTD | Estimate position based on RSTD |
| DLTDoA | RSTD from multiple BSs | — | Estimate position based on RSTD |
| m-RTT | RTT | — | Estimate position based on RTT |
| UL-AoA | — | AoA | Estimate position based on AoA |
| DL-AoD | RSRP/beam | Beam information | Estimate AoDs and use them to estimate the position |
| ECID | RSRP/beam | TA and B-RSRP | Estimate ToAs, AoDs and use them to estimate the position |

In terms of the horizontal or lateral/longitudinal accuracy, 3GPP requirements for absolute position or relative position can be categorized into three sets as follows:

Set 1: 10-50 m with 68-95% confidence level.

Set 2: 1-3 m with 95-99% confidence level.

Set 3: 0.1-0.5 m with 95-99% confidence level.

Accuracy of the positioning may increase with the availability of more than one assisting node. Geometric dilution of precision (GDOP) is an important problem in positioning that negatively affect the positioning accuracy when the target UE position is at one of the edges of the triangle, or even crosses the edge, and anchor UEs acts as the different vertex of the triangle. The effect of GDOP which occurs because of geometry, may decrease when target UE moves towards the center of the triangle. Increase in accuracy of measurement may help to minimize the GDOP of the target UE and may maintain accurate positioning of the target UE. Sidelink positioning may be deployed in three scenarios.

In scenario 1, the position of the target UE is limited by its coverage. Therefore, it will be difficult to find at least three neighbouring BSs to perform the positioning. In this scenario, the BS must find the devices nearby the target node. The neighbour UEs can be selected as assisting UEs based on the line of sight (LOS) link, doppler/mobility, distance from the target device, UE capability, and status-busy/idle. Furthermore, the location estimate of the assisting nodes must be known. In this scenario, the target UE and all assisting UEs will be in the direct or indirect coverage of the associated BS node. Indirect coverage means connected to neighbour BS, and the master BS communicates with the connected neighbour BS.

In scenario 2, where the target UE is out of coverage but can connect to BS via a UE relay, in such a scenario, the UE relay will act as a routing node and send the messages from the BS node to the target node and vice versa.

In scenario 3, where there is no network coverage scenario, neither the assisting UEs, the anchor UE (UE relay), nor the target node will be in the coverage of any BS.

There is a need of a method of positioning of the target UE in NR side-link communication, which address the above-mentioned shortcomings of the conventional methods of positioning of the target UE.

OBJECTIVES OF THE INVENTION

An objective of the present invention is to provide a method for enabling sidelink positioning in a cellular network.

Another objective of the present invention is to provide a method for resource configuration for sidelink positioning.

Another objective of the present invention is to provide a method for resource pool designing for sidelink positioning.

SUMMARY OF THE INVENTION

The present invention relates to a method of positioning a target node in a side-link communication system. An at least one first node may establish a communication link with at least one second node and at least one third node. The at least one first node may measure at least one of a relative Angle of Arrival (AoA) and a relative Angle of Departure (AoD) of the at least one third node with respect to the at least one second node. The target node may be one of the at least one first node, the at least one second node and the at least one third node. The at least one first node may estimate a position of the at least one target node based on at least one of a data related to at least one positioning measurement, the relative AoA, and the relative AoD.

In one aspect, at least one of the relative AoA and the AoD may be measured using the data related to at least one positioning measurement.

In one aspect, the at least one first node may receive from at least one of the at least one second node and the at least one third node, the data related to at least one positioning measurement. The data may be related to at least one positioning measurement is at least one of Time of Arrival (ToA), Time Difference of Arrival (TDoA), Reference Time of Arrival (RToA), Rx-Tx time difference, Reference signal Time Difference of Arrival (RTDoA), Reference Signal Carrier Phase (RSCP), Reference signal Carrier Phase Difference (RSCPD), the Reference Signal Time (RST) per path, Received Signal Strength (RSRP) per path, Line of Sight (LoS) probability, and a timestamp corresponding to at least one of positioning measurements AOA, and AoD.

In one aspect, the data related to at least one positioning measurement may be reported by at least one of the at least one second node and the at least one third node.

In one aspect, the data related to at least one positioning measurement may be determined by the at least one second node, using at least one Positioning Reference Signal (PRS) received from at least one of the at least one first node and the at least one third node.

In one aspect, the data related to at least one positioning measurement may be determined by the at least one third node, using at least one PRS received from at least one of the at least one first node and the at least one second node.

In one aspect, the at least one first node may obtain the data related to at least one positioning measurement. The data may be related to at least one positioning measurement is at least one of Time of Arrival (ToA), Time Difference of Arrival (TDoA), Reference time of arrival (RToA), Rx-Tx time difference, Reference Signal Time Difference of Arrival (RTDoA), Reference Signal Carrier Phase (RSCP), Reference Signal Carrier Phase Difference (RSCPD), the Reference Signal Time (RST) per path, Received Signal Strength (RSRP) per path, Line of Sight (LoS) probability, and a timestamp corresponding to at least one of positioning measurements AOA, and AoD.

In one aspect, the data related to at least one positioning measurement may be obtained by the at least one first node, using at least one PRS received from at least one of the at least one second node and the at least one third node.

In one aspect, the at least one PRS may be transmitted by at least one of the at least one first node, the at least one second node, and the at least one third node orthogonally in at least one of time, frequency, code, and space.

In one aspect, the at least one PRS may be transmitted by at least one of the at least one first node, the at least one second node, and the at least one third node orthogonally in at least one of time, frequency, code, and space.

In one aspect, the at least one PRS may be transmitted by at least one of the at least one first node, the at least one second node, and the at least one third node orthogonally in at least one of time, frequency, code, and space.

In one aspect, the position of the at least one target node may be estimated with respect to at least one of reference location.

In one aspect, the at least one reference location may be one of a global coordinate, the location of the at least one first node, at least one second node, and the at least one third node.

In one aspect, the at least one first node may be transmit the position of the at least one target node to at least one side-link positioning server.

In one aspect, the at least one side-link positioning server may reside in at least one of the at least one first node, at least one second node, the at least one third node, and a cellular network of the communication system.

In another aspect, the at least one side-link positioning server, may receive the data related to the at least one position measurement of the at least one target node from at least one first node. The at least one side-link positioning server may estimate the position of the at least one target node based on the data related to the at least one position measurement.

In one aspect, the at least one PRS may be generated based on at least one of a sequence design, a frequency domain pattern, a time domain pattern, a time domain behavior, and supported bandwidth to minimize error in channel estimation due to fading in time and frequency due to doppler and multipath.

In one aspect, the at least one PRS may be generated based on at least one of a sequence design, a frequency domain pattern, a time domain pattern, a time domain behavior, and supported bandwidth to minimize error in channel estimation due to fading in time and frequency due to doppler and multipath.

In one aspect, the at least one PRS may be generated based on at least one of a sequence design, a frequency domain pattern, a time domain pattern, a time domain behavior, and supported bandwidth to minimize error in channel estimation due to fading in time and frequency due to doppler and multipath.

In one aspect, the at least one PRS may be generated using pseudo random gold sequence.

In one aspect, the gold sequence is initialized using at least one of a slot number, a symbol number, and a parameter $$n_{ID,seq}^{SL-PRS}.$$

In one aspect, the parameter $$n_{ID,seq}^{SL-PRS}$$

may be one of provided by the higher layer of the transmitting nodederived from 12 Least Significant Bits (LSBs) Cyclic Redundancy Check (CRC), of Physical Sidelink Control Channel (PSCCH) associated with the PRS, and a combination of parameter provided by higher layer of the transmitting node and 12 LSB bits CRC of PSCCH associated with the at least one PRS.

In one aspect, the at least one PRS may be configured in time-frequency resource in a slot using time domain pattern and frequency domain pattern.

In one aspect, the frequency domain pattern may include comb size, resource element (RE) offset within the RB, and wherein the RE offset is derived from initial offset and offset specific to the at least one PRS symbol.

In one aspect, the time domain pattern may include number of PRS symbols, start of the at least one PRS symbol in the slot.

In another aspect, a method of resource allocation for positioning a target node in a sidelink communication may comprise configuring by at least one node, a resource pool in a slot divided into plurality of sub-channels in frequency domain. At least one sub-channel from the plurality of sub-channels may be configured by the at least one node, with at least one of at least one Positioning Reference Signal (PRS), at least one data signal comprising at least one of PRS configuration resource sets, reporting configurations, assisting information, a trigger for positioning measurements, measurement reporting, and capability sharing, at least one control signal comprising at least one Sidelink Control Information (SCI). The at least one SCI may be associated with at least one of the at least one PRS and data signal transmitted in the at least one sub-channel in the slot, at least one feedback channel, at least one Automatic Gain Control (AGC) symbol, and at least one time gap symbol.

In one aspect, the at least one node may signal configuration of the resource pool to at least one another node.

In one aspect, the target node may be at least one of the at least one node and the at least one another node whose position is estimated.

In one aspect, the position estimated may be at least one of absolute position with respect to a global coordinate, relative position with respect to one of the at least one node and a predefined coordinates, and ranging in terms of at least one of direction and distance.

In one aspect, the at least one node may transmit at least one of the at least one PRS, the at least one data signal, at least one control signal, and at least one feedback signal using the resource pool configured by the at least one node.

In one aspect, the at least one node may receive at least one of the at least one PRS, the at least one data signal, at least one control signal, at least one feedback signal using the resource pool configured by the at least one node.

In one aspect, the resource pool may be one of a dedicated resource pool for positioning, and a shared resource pool for sidelink communication and positioning.

In one aspect, the at least one sub channel may comprise plurality of Resource Blocks (RBs). The plurality of RBs may be consecutive and non-overlapping.

In one aspect, the resource pool may be defined using at least one of a start of the side-link positioning resource pool in terms of Physical Resource Block (PRB), number of consecutive PRBs in the side-link positioning resource pool, number of subchannels in the side-link positioning resource pool, size of each sub-channel, Sidelink Positioning Reference Signal (SL-PRS) resource configuration, SL-PRS resource configuration set, power control, and time domain configuration of side-link positioning resource pool.

In one aspect, the SL-PRS may include at least one of SL-PRS resource ID, SL-PRS comb offset, SL-PRS comb size, SL-PRS starting symbol, number of SL-PRS symbols, SL-PRS frequency domain allocation, and periodicity of SLPRS resource.

In one aspect, the resource pool may be configured using at least one of Radio Resource Control (RRC), Medium Access Control-Control Element (MAC-CE), Downlink Control Information (DCI), preconfigured and pre-defined in the specification.

In one aspect, the at least one node may signal the time domain configuration of the resource pool in predetermined time, and wherein the predetermined time is signaled using at least one of a symbol, a min-slot, a slot, a subframe, and a frame.

In one aspect, the at least one PRS may be generated using pseudo random Gold sequence.

In one aspect, initialising the gold sequence may be done using at least one of slot number, symbol number, and a parameter $$n_{ID,seq}^{SL-PRS}.$$

In one aspect, the parameter $$n_{ID,seq}^{SL-PRS}$$

may be one of provided by a higher layer of the transmitting node, derived from 12 Least Significant Bits (LSBs) Cyclic Redundancy Check (CRC) of Physical Sidelink Control Channel (PSCCH) associated with the PRS, and a combination of the parameter provided by the higher layer of the transmitting node and 12 LSB CRC of PSCCH associated with the PRS.

In one aspect, the at least one PRS may be configured in the resource pool using time domain and frequency domain parameters.

In one aspect, the frequency domain parameter may include comb size and Resource Element (RE) offset within the RB, and wherein the RE offset is derived from an initial offset and offset specific to the PRS symbol.

In one aspect, the time domain parameter may include at least one of number of PRS symbols and start of the PRS symbol in the slot.

In one aspect, the number of PRS symbols in a slot may be one of consecutive and nonconsecutive Orthogonal Frequency Division Multiplexing (OFDM) symbols.

In one aspect, the at least one data signal may be carried through Physical Side-link Shared Channel (PSSCH), the at least one control signal is carried through Physical Side-link Control Channel (PSCCH), and the at least one feedback signal is carried through Physical Side-link Feedback Channel (PSFCH).

In one aspect, the at least one PRS, the PSSCH, and the PSCCH may be multiplexed in a slot structure.

In one aspect, the PSCCH may comprise a first stage Side-link Control Information (SCI) and Demodulation Reference Signals (DMRS).

In one aspect, the PSCCH may be configured in at least one of one OFDM symbol, two OFDM symbols and three OFDM symbols, and wherein the PSCCH is configured by higher layer including one of MAC-CE, RRC and pre-configuration.

In one aspect, frequency domain resource of the PSCCH may be configured by higher layer including one of MAC-CE, RRC and pre-configuration where the frequency domain resource includes one of 10 resource blocks (RBs), 12 RBs, 15 RBs, 29 RBs, 25 RBs, 30 RBs, 40 RBs, 50 RBs and preconfigured RBs less than resource pool bandwidth.

In one aspect, the PSSCH may be utilized for reporting at least one of assisting information, positioning resource configuration, positioning measurement reporting configuration, positioning resource trigger, legacy Sidelink Shared Channel (SL-SCH), and second-stage SCI.

In one aspect, the second stage SCI may be carried within the resources of the PSSCH as concatenation with SL-SCH bit stream.

In one aspect, the PSSCH may carry one second stage SCI indicating PSSCH and SL-PRS, and at least two second stage SCIs concatenated together for PSSCH and at least one SL-PRS separately.

In one aspect, the second stage SCI may be concatenated with SL-SCH bit stream one of at the start and in the end.

In one aspect, the PSFCH may be utilized for reporting measurements associated with the at least one PRS.

In one aspect, the first stage SCI may comprise at least one of time and frequency resource allocation of the at least one of at least one PRS and the at least one PSSCH, Modulation and Coding Scheme (MCS) for the PSSCH, priority of associated with at least one of PSSCH and PRS, resource reservation period, time pattern for PSSCH DMRS, size and format of second stage SCI, source ID, destination ID, cast type, at least one PRS resource ID, PRS presence indicator, PSSCH presence indicator, and PRS resource triggered PRS report trigger.

In one aspect, the at least one PRS resource ID may be indicated using at least one of bit map equal to number of PRS resource IDs and binary encoded format.

In one aspect, the second stage SCI may comprise Hybrid Automatic Repeat Request (HARQ) process ID, new data indicator and redundancy version, Source Identifier (ID) and Destination ID, HARQ enabled or disabled indicator, PRS resource trigger, at least one PRS Resource ID, PRS resource configuration, PRS priority, LCS session ID, HARQ enabled/disabled indicator associated with the PSSCH, configuration, PRS resource trigger ID and reporting configuration trigger, and PRS reporting trigger.

In one aspect, the at least one PRS resource ID may be indicated using at least one of bit map equal to number of PRS resource IDs and binary encoded format.

In one aspect, the at least one AGC symbol may be preceded with at least one of the at least PRS, at least one of control signal, and at least one data signal.

In one aspect, one AGC symbol may be configured at the beginning of the slot, if at least one of the at least one PRS, the at least one control channel, and the at least one data channel is to be received from single node.

In one aspect, the at least one PRS may be received from plurality of at least one node, the at least one AGC symbol is preceded by the at least one PRS received from each node in the plurality of at least one node.

In one aspect, when the slot contains at least one of feedback channel and the PSSCH carrying a PRS measurement report, then the at least one of feedback channel and the PSSCH carrying the PRS measurement report may be preceded by at least one guard symbol.

In one aspect, if the slot contains at least two PRS resources configured, then at least one guard symbol may configured in between pair of PRS resources.

In one aspect, the at least one pair of PRS resources may be configured in opposite direction.

In one aspect, at least one Base Station (BS) may configure the resource pool for side-link positioning to at least one node.

In one aspect, the at least one BS may share the PRS resources to at least one side-link positioning server configured to the at least one node.

In one aspect, the at least one side-link positioning server may configure the PRS resources to the at least one node.

In one aspect, the at least one node may detect the at least one sub-channel using at least one of the PRS resource, first stage SCI, second stage SCI, and the PSCCH DMRS.

In one aspect, the at least one node may select the sub-channels for transmitting the at least one PRS based on an occupancy of the sub-channels.

In one aspect, the at least one node may autonomously select at least one sub-channel available and transmit the at least one PRS to the at least one another node.

In one aspect, the shared resource pool may be shared among the PRS resources and the PSSCH carrying legacy SL SCH bitstream.

In one aspect, the at least one node may transmit the position of the at least one target node to at least one side-link positioning server.

In one aspect, the position of the at least one target node may be transmitted to the at least one side-link positioning server through the dedicated resource pool or the shared resource pool.

In one aspect, the position of the at least one target node may be transmitted using reporting configurations, and wherein the reporting configurations are defined by at least one of the at least one side-link positioning server, and the at least one node.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

FIG. 2(*b*) illustrates estimation of relative Angle of Departure (AoD) in the wireless communication network, in accordance with an embodiment of the present invention;

FIG. 4(*b*) illustrates an example of UL-PRS resource allocation according to COMB-factor and RE-offset, in accordance with an embodiment of the present invention;

DETAILED DESCRIPTION OF THE INVENTION

Figure 1A:
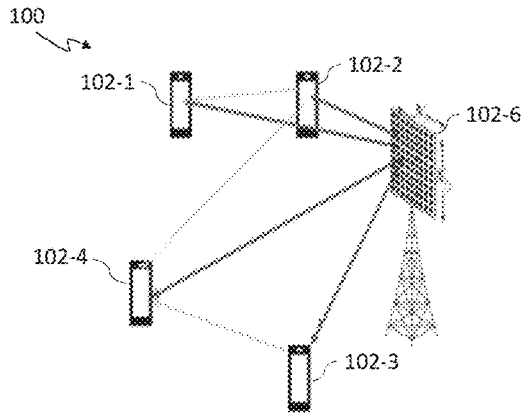
FIGS. 1(*a*) to 1(*d*) illustrate an architecture for different scenario for positioning of a target UE in a wireless communication network, in accordance with an embodiment of present invention.
Figure 1B:
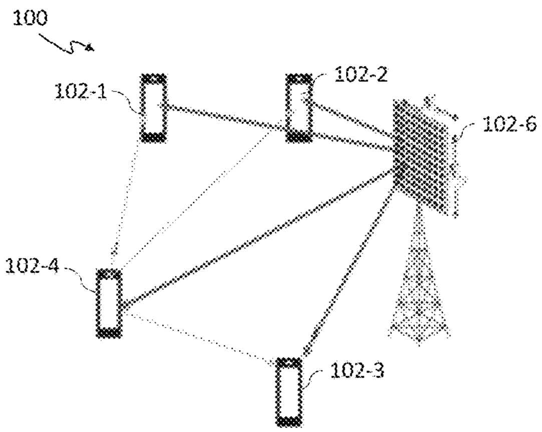
Figure 1C:
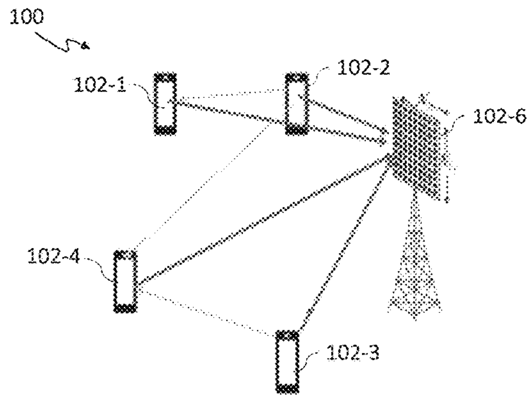
Figure 1D:
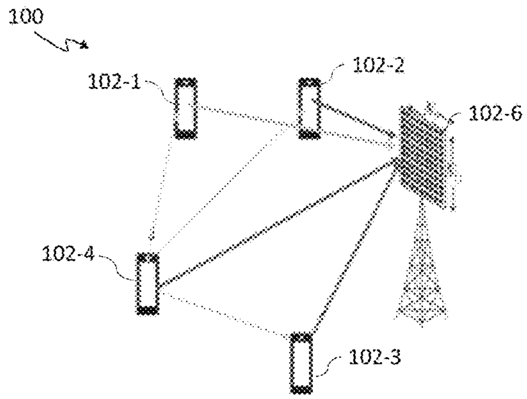

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Specific terms used in the description below are introduced to help understanding the present invention, and specific terms can be used in different ways as long as it does not leave the technical scope of the present invention.

A target User Equipment (UE) may be positioned using an anchor UE and an assisting UE. The anchor UE may handle the positioning requests from all the assisting or target UEs. The anchor UE may identify the target UEs and their neighbouring UEs which acts as assisting UEs. The anchor UE may provide resource allocation for positioning and may be responsible for orthogonality in resource allocation between different UEs. The anchor UE may establish the connection with assisting and target UEs for positioning. These connections may facilitate the exchange of capabilities, assistance information, positioning measurements, and reporting resources between target UEs and assisting UEs. The anchor UE may be equivalent to the Location Management Function (LMF) in LTE and NR.

A target UE may support positioning through sidelink using reference signals. Position of the target UE may be estimated based on measurements performed on reference signals. The target UE may have the capability to estimate positioning using the measurements.

Assisting UEs may be a group of UEs that lie in the neighbourhood of the target UE and are involved by the anchor UE for assistance in the localization of the target UE. Direction of data transmission of the assisting UEs and the target UE may complement to each other depending on configured positioning method(s). For instance, if a positioning method invoked is DL-TDOA like, then the target UE may be in downlink mode to receive the positioning reference signal and assisting UEs may be configured in uplink mode to transmit the positioning reference signal, and vice-versa in the case of Uplink-Time Difference of Arrival (UL-TDOA) like method. The target UE may support the positioning through side-link using reference signals. The position of the target UE may be estimated based on measurements performed on reference signals. The target UE may have the capability to estimate positioning using the measurements.

The present invention describes methods of enabling sidelink positioning in a cellular network. FIG. 1(*a*) illustrates an architecture for a first scenario for positioning of a target UE in a wireless communication network 100, in accordance with an embodiment of present invention. The wireless communication network 100 may comprise a Base Station (BS) and User Equipments (UEs), such as a first UE 102-1 through $n^{th}$ UE 102-*n*. The first UE 102-1 through $n^{th}$ UE 102-*n* are cumulatively referred as a UE 102 for ease of labelling and explanation. The BS may communicate with the UEs 102. The UEs 102 may be either stationary or mobile and may be dispersed throughout the wireless communication network 100.

In a timing based Side Link (SL) positioning method, a positioning server may configure the assisting UEs and the target UE in a complementary direction to receive Positioning Reference Signal (PRS) over a sidelink. In one scenario, one of a Location Management Function (LMF) or a positioning server may configure assisting UEs 102-1 to 102-3 for positioning of a target UE 102-4. The assisting UE 102-1 may transmit at least one PRS sequence in a preconfigured PRS resource known to a target UE 102-4. The assisting UE 102-1 may transmit at least one PRS sequence in a preconfigured PRS resource known to the target UE 102-4. One of the UEs 102 may act as an anchor UE. The target UE 102-4 may receive the PRS and may measure a Reference Signal Time (RST) or Reference Signal Time Difference (RSTD) based on the PRS. The RSTD may indicate a difference between the RST of assisting UE 102-1 and the RST from a reference node 102-6. The reference node 102-6 may be one of a reference UE or anchor UE or a Transmission and Reception Point (TRP) or a Base Station like gNB, eNB, NB, repeater, Integrated Access and Backhaul (IAB) node, and Network Control Repeater (NCR).

For estimation of location using the measurements, knowledge of location of the assisting UEs 102-1 to 102-3 and the reference node 102-6 may be necessary. It may not be possible to know locations of all the assisting UEs 102-1 to 102-3, however, position of the target UE 102-4 may be estimated if location of the reference UE 102-6 is known. Additional measurements such as the TDOA and TOA may be reported to the positioning server, to assist the positioning server in estimating the position of the target UE 102-4. The measurements may be used for direction and distance-based ranging between target UE 102-4 and one of assisting UEs 102-1 to 102-3 or reference UE 102-6.

The assisting UE 102-1 may transmit the PRS in different time slots to the reference UE (or the anchor UE) 102-6. Further, the reference node 102-6 may receive the reference signal along with the target UE 102-4 if a direction of Side Link Positioning Reference Signal (SL-PRS) transmission is from assisting UE 102-1 to the target UE 102-4. Otherwise, the reference node 102-6 may receive the reference signal along with the assisting UE 102-1 if the direction is from the target UE 102-4 to the assisting UE 102-1.

The PRS transmitted by the reference node 102-6 may be a broadcast type RS. The PRS may be received by all the assisting UEs 102-1 to 102-3 and the target UE 102-4. The assisting UEs 102-1 to 102-3 and the target UE 102-4 may measure the Reference Signal Time (RST) indicated by Time of Arrival (ToA) of the PRS. Both the assisting UEs 102-1 to 102-3 and the target UE 102-4 may report the TOA and TDOA to the reference UE 102-6 or the positioning server for positioning estimation. The assisting UEs 102-1 to 102-3 may transmit SL-PRS to the target UE 102-4 and may measure the TDOA whereas the assisting UEs 102-1 to 102-3 may transmit the SL-PRS to the reference UE 102-6 and may measure the TOA. The TDOA and TOA may be reported to the positioning server.

In another implementation, the reference UE 102-6 may measure the TOA from the assisting UEs 102-1 to 102-3 and the target UE 102-4. The reference node 102-6 may send the measurement of the TOA to the positioning server. The TDOA and TOA will be reported to the positioning server by the reference UE 102-6 and the assisting UEs 102-1 to 102-3. The positioning server may utilize the measurements of TOAs, location of the reference node 102-6, and the measurement of the TDOA reported by the assisting UEs 102-1 to 102-3 or the target UE 102-4 to estimate a final position of the target UE 102-4.

As illustrated in FIG. 1 (*a*), the assisting UE 102-1 may transmit the SL-PRS to the target UE 102-4 and the target UE 102-4 may measure the positioning measurements with respect to the reference node 102-6 whereas the reference node 102-6 may transmit the SL-PRS to the assisting UE 102-1 and the assisting UEs may measure the positioning measurements. The assisting UEs 102-1 to 102-3 may transmit SL-PRS to the target UE 102-4. The reference UE 102-6 may transmit the SL-PRS to the assisting UEs 102-1 to 102-3 and the target UE 102-4. The target UE 102-4 may measure data related to the positioning measurements including at least one of TDOA, reference signal time difference (RSTD), TOA, Reference Time of Arrival (RToA), AoA, Rx-Tx time difference, Reference Signal Carrier Phase (RSCP), Reference Signal Carrier Phase difference (RSCP), relative synchronization time difference, synchronization source, and AOD. The assisting UE may also measure the data related to positioning measurements including at least one of TDOA, RSTD, TOA, RTOA, AoA, Rx-Tx time difference, RSCP, RSCPD, relative synchronization time difference, synchronization source, and AOD using a PRS received from the reference UE 102-6. The measurements of TDOA, RSTD, TOA, RTOA, AoA, Rx-Tx time difference, RSCP, RSCP, relative synchronization time difference, synchronization source, and/or AOD may be reported to the reference UE 102-6 or/and the positioning server. The relative synchronization time is the synchronization offset between the anchor UEs/assisting UEs 102-1 to 102-3 participating in the localization/positioning of the target UE 102-4. The relative synchronization time may be obtained by determining the location of the anchor UEs/assisting UEs 102-1 to 102-3. The synchronization source can be GNSS (like GPS, NavIC, GLONASS, Galileo, Baidu), cell ID, and syncRefUE ID. The reference UE 102-6 may measure relative AoD between the target UE 102-4 and at least one of the assisting UEs 102-1 to 102-3 using AoD measurements from the target UE 102-4 and at least one assisting UEs 102-1 to 102-3. The reference UE 102-6 or positioning server may use data related to the positioning measurements of at least one of TDOA, TOA RSTD, TOA, RTOA, Rx-Tx time difference, and RSCP, relative synchronization time difference, synchronization source, AOD and relative AOD to estimate position of target UE 102-4. The measurement from the anchor UE may be used for synchronization correction if the location of assisting UEs 102-1 to 102-3 is known.

FIG. 1(*b*) illustrates an architecture for a second scenario for positioning of the target UE 102-4 in a wireless communication network 100, in accordance with an embodiment of present invention. The target UE 102-4 may transmit the SL-PRS to the assisting UEs 102-1 to 102-3 and the assisting UEs 102-1 to 102-3 may measure the time domain positioning measurements. The reference UE 102-6 may transmit the SL-PRS to the assisting UEs 102-1 to 102-3 and the assisting UEs 102-1 to 102-3 may measure the positioning measurements. Further, the assisting UEs 102-1 to 102-3 may transmit the SL-PRS, and the target UE 102-4 may estimate the positioning measurements from the assisting UEs 102-1 to 102-3. The target UE 102-4 may transmit the SL-PRS to the assisting UEs 102-1 to 102-3, whereas the reference UE 102-6 may transmit the SL-PRS to the assisting UEs 102-1 to 102-3 and the target UE 102-4. The assisting UEs 102-1 to 102-3 may measure the positioning measurements including at least one of TDOA, RSTD, TOA, RTOA, Rx-Tx time difference, RSCP, AoA, relative synchronization time difference, synchronization source, and AOD. The target UE 102-4 may also measure the positioning measurements including at least one of TOA, RSTD, TOA, RTOA, Rx-Tx time difference, RSCP, AoA, relative synchronization time difference, synchronization source, and AOD on the SL-PRS received from the reference UE 102-6. The reference UE 102-6 may measure relative AoD between target UE 102-4 and at least one of the assisting UEs 102-1 to 102-3 using the AOD measurements from target and at least one assisting UEs 102-1 to 102-3. At least one of TDOA, RSTD, TOA, RTOA, Rx-Tx time difference, RSCP, AoA, AoD, relative synchronization time difference, synchronization source, and relative AoD may be reported to the positioning server or the reference UE 102-6 may estimate position of the target UE 102-6.

FIG. 1(*c*) illustrates an architecture for a third scenario for positioning of the target UE 102-4 in a wireless communication network 100, in accordance with an embodiment of present invention. The assisting UEs 102-1 to 102-3 may transmit SL-PRS to the target UE 102-4 and the target UE may measure the positioning measurements whereas assisting UEs 102-1 to 102-3 may transmit the SL-PRS to the reference UE 102-6 and the reference UE may measure the positioning measurements. The assisting UEs 102-1 to 102-3 may transmit the SL-PRS to the target UE 102-6 and the target UE 102-6 may transmit the SL-PRS to the reference UE 102-6 only. The assisting UEs 102-1 to 102-3 may transmit the SL-PRS to the reference UE 102-6. The reference UE 102-6 may measure the positioning measurements consist of at least one of TDOA, RSTD, TOA, RTOA, Rx-Tx time difference, RSCP, AoA, relative synchronization time difference, synchronization source, and AOD. The target UE 102-6 may also measure the positioning measurements consist of at least one of TDOA, RSTD, TOA, RTOA, Rx-Tx time difference, RSCP, AoA, relative synchronization time difference, synchronization source, and AOD based on PRS received from assisting UEs 102-1 to 102-3. At least one of TDOA, RSTD, TOA, RTOA, Rx-Tx time difference, RSCP, AoA, and AOD measurements may be reported to the positioning server and/or reference UE 102-6 by target UE 102-4. The reference UE 102-6 may measure relative AoA between target UE and at least one of the assisting UEs 102-1 to 102-3 using the AoA measurements from target UE 102-6 and at least one assisting UEs 102-1 to 102-3. If the reference UE 102-6 may estimate the position of the target UE 102-6, then the reference UE 102-6. The measurements of at least one of TDOA, RSTD, TOA, RTOA, Rx-Tx time difference, RSCP, AoD, AoA, and relative AoA from the reference UE 102-6 and the target UE 102-4 to estimate the position of target UE 102-4. If the positioning server estimates the position of a target UE 102-4, then the reference UE 102-6 may forward the measurements from the assisting UEs 102-1 to 102-3 and the target UE 102-4 to the positioning server. The target UE 102-4 may forward measurements directly the positioning server. Using these measurements, the positioning server will measure the position of target UE 102-4.

FIG. 1(*d*) illustrates an architecture for a fourth scenario for positioning of the target UE 102-4 in a wireless communication network 100, in accordance with an embodiment of present invention. The assisting UEs 102-1 to 102-3 may transmit the SL-PRS to the target UE 102-4 and the target UE 102-4 may measure the positioning measurements whereas the assisting UEs 102-1 to 102-3 may transmit the SL-PRS to the reference UE 102-6 and the reference UE 102-6 may measure the positioning measurements. The positioning measurements may be reported to the positioning server. The target UE 102-4 may send the SL-PRS to the assisting UEs 102-1 to 102-3 and the assisting UEs 102-1 to 102-3 may send the PRS to the reference UE 102-6. The target UE 102-4 may send the SL-PRS to the reference UE 102-6. The reference UE 102-6 may measure the positioning measurements consist of at least one of TDOA, TOA, AoA, and AOD. The assisting UEs 102-1 to 102-3 may measure the positioning measurements consist of at least one of TDOA, RSTD, TOA, RTOA, Rx-Tx time difference, RSCP, AoA, and AOD based on PRS received from the target UE 102-4. At least one of TDOA, RSTD, TOA, RTOA, Rx-Tx time difference, RSCP, AoA, and AOD measurements may be reported to the positioning server and/or reference UE 102-6 by the assisting UEs 102-1 to 102-3. The reference UE 102-6 may measure relative AoA between the target UE 102-4 and at least one of the assisting UEs 102-1 to 102-3 using the AoA measurements from target and at least one assisting UEs 102-1 to 102-3. If the reference UE 102-6 estimates position of the target UE 102-4, then the reference UE 102-6 may use the at least one of TDOA, RSTD, TOA, RTOA, Rx-Tx time difference, RSCP, RSCP, AoD, AoA, and relative AoA measurements from the reference UE 102-6 and the assisting UEs 102-1 to 102-3 to estimate the position of target UE 102-4. If the positioning server estimates the position of the target UE 102-4, then the reference UE 102-6 may forward the measurements from the assisting UEs 102-1 to 102-3 and the target UE 102-4 to the positioning server. The assisting UEs 102-1 to 102-3 may forward measurements directly the positioning server. Using the measurements, the positioning server may measure the position of target UE 102-4.

Figure 2A:
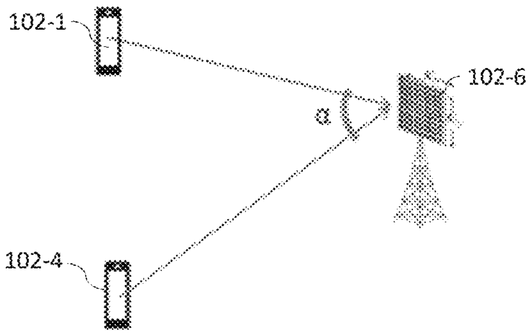
FIG. 2(*a*) illustrates estimation of relative Angle of Arrival (AoA) in the wireless communication network, in accordance with an embodiment of the present invention.
Figure 2B:
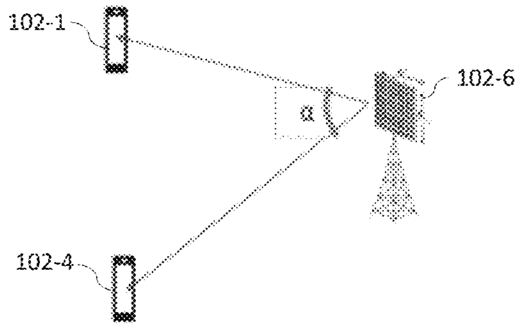

Further, the reference UE 102-6 may measure the angle of departure (AoD) and/or angle of arrival (AoA) from target and assisting UEs 102-1 to 102-3. FIG. 2(*a*) illustrates estimation of relative Angle of Arrival (AoA) in a wireless network, in accordance with an embodiment of the present invention. Measurements of positioning measurements like TDOA, RSTD, TOA, RTOA, Rx-Tx time difference, RSCPover the target UE 102-4 link, between the reference node 102-6 and the assisting UEs 102-1 to 102-3, between the reference node 102-6 and the target UE 102-4, and angle between the target UE 102-4 and assisting UEs 102-1 to 102-3 link may be used to estimate the position of the target UE 102-4. The position may be absolute in terms of global coordinates or relative coordinates with respect to locations of one of the assisting UEs 102-1 to 102-3 and the reference node 102-6.

FIG. 2 (*b*) illustrates estimation of relative Angle of Departure (AoD) in the wireless communication network, in accordance with an embodiment of the present invention. the assisting UEs 102-1 to 102-3 and the target UE 102-4 may transmit the PRS to reference UE 102-6 as per one of the previous methods described in explanations of FIGS. 1(*a*) to 1(*d*). The reference UE 102-6 may measure the AoA from both the target UE 102-4 and assisting UEs 102-1 to 102-3. An 'α' angle as relative angle between the assisting UEs 102-1 to 102-3 and the target UE 102-4, may be estimated.

As illustrated in FIG. 2(*b*), the assisting UEs 102-1 to 102-3 and the target UE 102-4 may transmit the PRS to reference UE 102-4 as per one of the previous methods described in FIGS. 1(*a*) to 1(*d*). The reference UE 102-6 may measure the AoD from both the target UE 102-4 and assisting UEs 102-1 to 102-3. An 'a' angle as relative angle between the assisting UEs 102-1 to 102-3 and the target UE 102-4, may be estimated.

At least one of the target UE 102-6 and the assisting UEs 102-1 to 102-3 may perform one or more than one measurement of TDOA, RSTD, TOA, RTOA, Rx-Tx time difference, RSCP. The measurements may correspond to multiple paths, including LOS and NLOS paths, same path but over different instances in time, group of clutters or paths. At least one of the target UE 102-6 and the assisting UEs 102-1 to 102-3 may measure the angle of arrival (AoA), Received Signal Strength Power (RSRP), LOS probability, and a timestamp corresponding to each RSTD or RST. One or more of the measurements will be reported to LMF using a provideLocationInformation message. After measurement or estimation, the assisting UEs 102-1 to 102-3 may transmit the measurements as a response of the provideLocationInformation message. The provideLocationInformation message may contain the measurements or estimate to be reported to the anchor UE.

Figure 3:
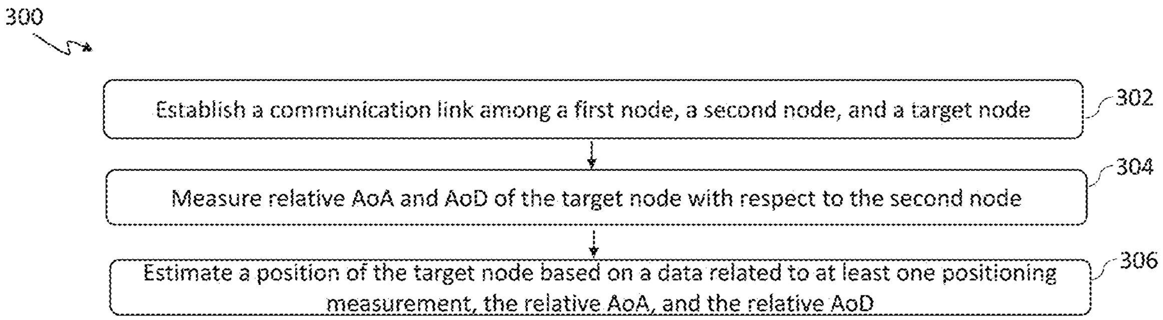
FIG. 3 illustrates a flow chart of a method of positioning the target node in a side-link communication system operating in the wireless communication network, in accordance with an embodiment of the present invention.

FIG. 3 illustrates a flow chart 300 of a method of positioning a target node in a side-link communication system operating in a wireless communication network, in accordance with an embodiment of the present invention. It should also be noted that in some alternative implementations, the functions noted in the blocks may occur out of the order noted in the drawings. For example, two blocks shown in succession in FIG. 3 may in fact be executed substantially concurrently or the blocks may sometimes be executed in the reverse order, depending upon the functionality involved. Alternate implementations are included within the scope of the example embodiments in which functions may be executed out of order from that shown or discussed, including substantially concurrently or in reverse order, depending on the functionality involved.

In the wireless communication network 100, the anchor UE may establish a communication link among the target UE 102-4 and the assisting UEs 102-1 to 102-3, at step 302. The anchor UE, the target UE 102-4, and the assisting UEs 102-1 to 102-3 may send/receive at least one Positioning Reference Signal (PRS), at step 304. One of the at least the target UE 102-4 and the assisting UEs 102-1 to 102-3, or the anchor UE may determine the data related to the positioning measurement may include Time of Arrival (ToA), Time Difference of Arrival (TDOA), RSTD, TOA, RTOA, Rx-Tx time difference, RSCP, AOA, and AoD, at step 306. The data related to positioning measurement may be determined by one of the at least the target UE 102-4 and the assisting UEs 102-1 to 102-3 based on the at least one PRS received from the anchor UE. The data related to positioning measurement may be determined by the anchor UE based on the at least one PRS received from one of the at least the target UE 102-4 and the assisting UEs 102-1 to 102-3. The PRS may be transmitted in form of a side-link Synchronization Signal Block (SL-SSB), a side-link Demodulation Reference Signal (DMRS), a side-link Channel State Information Reference Signal (CSI-RS), and a Sounding Reference Signal (SRS).

The PRS may be determined by one of the at least the target UE 102-6 and the assisting UEs 102-1 to 102-3 based on at least one of Reference Signal Time (RST), Reference Signal Time Difference (RSTD), Angle Of Arrival (AoA), Received Signal Strength (RSRP), Line of Sight (LoS) probability, and a timestamp corresponding to each RSTD/RST. Based on the data related to positioning measurement, the anchor UE may measure a relative Angle of Arrival (AoA) and a relative Angle of Departure (AoD) of the at least one target node 102-6 based on a data related to positioning measurement. The position of the at least one target node 102-4 may be estimated in terms of global coordinates or with respect to location of the anchor UE and the assisting UEs 102-1 to 102-3. The at least target UE 102-6 and the assisting UEs 102-1 to 102-3 may be positioned in a complementary direction to receive the at least one PRS over side-link.

In one implementation, at least one PRS in the Uu link between the UEs 102 and Radio Access Network, may be designed to perform the positioning-related measurement. At least one PRS may be designed to minimize error in channel estimation due to fading in time and frequency due to Doppler and multipath, based on one or more parameters. The one or more parameters may comprise at least one of a sequence design, a frequency domain pattern, a time domain pattern, a time domain behavior, and supported bandwidth. Resource configurations provided to the UEs 102 may indicate the parameters for generation and transmission of Reference Signals (RS), repetition/periodicity of RS resource sets, transmission filters, and transmission frequency bands. The resource configurations for the receiver may contain RS-IDs, measurement windows, measurement gaps, frequency bands, and receive filters.

Figure 4A:
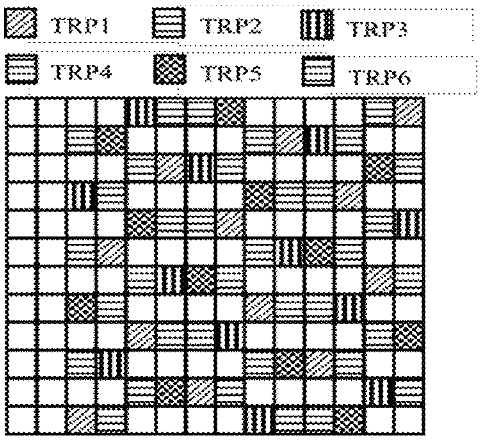
FIG. 4(*a*) illustrates an example of DL-PRS resource allocation according to COMB-factor and RE-offset, in accordance with an embodiment of the present invention.
Figure 4B:
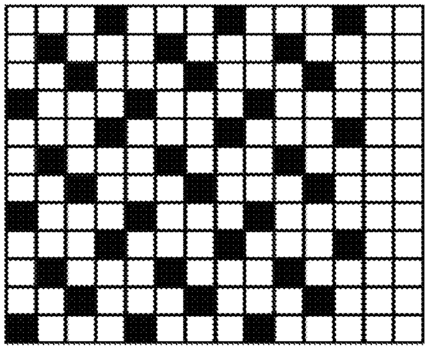

FIG. 4(*a*) illustrates an example of DL-PRS resource allocation according to COMB-factor and RE-offset, in accordance with an embodiment of the present invention. FIG. 4(*b*) illustrates an example of UL-PRS resource allocation according to COMB-factor and RE-offset, in accordance with an embodiment of the present invention. For Uu link positioning, the DL-PRS resource allocation is demonstrated with COMB-12 multiplexing six base stations and UL-SRS resource allocation is demonstrated with COMB-4.

Sidelink resources for sidelink positioning may be allocated from legacy sidelink resource pool for data transmission in Physical Sidelink Shared Channel (PSSCH) and control transmission in Physical Sidelink Control Channel (PSCCH). In another way, sidelink resources for sidelink positioning may be allocated from dedicated resource pool configured only for positioning purpose. The sidelink resources may be allocated by the network in one of mode 1 type of resource allocation or preconfigured to the sidelink devices. For positioning purposes, in one implementation, a dedicated resource pool may be used for PRS transmission, assistance information transmission and reporting of measurements. In another implementation, a combination of a legacy shared resource pool and dedicatedresource pool may be used. The shared resource pool may be shared among the PRS resources and the PSSCH carrying sidelink data in the SL-SCH.

In one implementation, an information including at least one of the PRS configuration resource sets, reporting configurations, assisting information, a trigger for positioning measurements, measurement reporting, and capability sharing, may be transmitted for sidelink positioning. Part of the information may be transmitted on the legacy resource pool and remaining information may be transmitted on the dedicated resource pool for sidelink positioning. This information may or may not be mutually exclusive.

The SL PRS sequence may be generated based on Gold sequence, given by below mentioned Equation 1:

$$r(n) = \frac{1}{\sqrt{2}}(1 - 2 \cdot c(2n)) + j\frac{1}{\sqrt{2}}(1 - 2 \cdot c(2n+1)), \qquad \text{(equation 1)}$$

For SL PRS sequence generation, a pseudo-random sequence c(i) initialization equation may be defined as a function of at least a slot number, a symbol number, and a parameter $$n_{ID,seq}^{SL-PRS}.$$

The pseudo-random sequence c(i) initialization equation is based on initialization equation as for DL PRS.

Range of the parameter $$n_{ID,seq}^{SL-PRS}$$

is:

$$n_{ID,seq}^{SL-PRS}$$

$\in\{0, 1, \ldots, 4095\}$. For the SL PRS sequence generation, the parameter $$n_{ID,seq}^{SL-PRS}$$

is provided by higher layers to a transmitting UE. The higher layer parameter is provided to a receiving UE via LPP or SLPP. In one method, $$n_{ID,seq}^{SL-PRS}$$

is provided by higher layer, in another method $$n_{ID,seq}^{SL-PRS}$$

is provided by 12 Least Significant Bits (LSBs) Cyclic Redundancy Check (CRC) of Physical Sidelink Control Channel (PSCCH) associated with the SL PRS, and in yet another method $$n_{ID,seq}^{SL-PRS}$$

is considered as combination of higher layer parameter and 12 LSBs CRC of PSCCH. When the SL PRS is used for resource sensing purpose in a Mode 2 type of resource configuration, then the parameter $$n_{ID,seq}^{SL-PRS}$$

is based on 12 LSB bits of CRC of PSCCH associated with the SL PRS are used. For an example, if a particular transmitting UE has configured SL PRS for some other transmitting UE and indicated the resource configuration using the PSCCH, then the receiving UEs looking for the resources for its own transmission using mode 2 type of resource allocation may be able to exclude such resources. Therefore, it is important to use the SL PRS for resource sensing. To enable resource sensing using the SL PRS, the parameter $$n_{ID,seq}^{SL-PRS}$$

must be known. But, it may be possible a higher layer may not configure the parameter during resource sensing to the receiving UE. Moreover, even if the parameter is configured by the transmitting UE to an intended receiving UE, non-intended receiving UE may not be configured with the higher layer parameter. In such a case, the parameter $$n_{ID,seq}^{SL-PRS}$$

may be based on 12 LSB bits CRC of PSCCH associated with the SL PRS even if higher layer parameter is configured.

Time-frequency domain allocation of SL PRS in the resource pool may be represented as combination of (M, N), where M is a number of consecutive OFDM symbols in a slot that are allocated for each PRS resource in a PRS resource set and N is the comb size. For a RE-offset sequence for SL PRS, the RE-offset sequences specified for DL PRS may be considered as a starting point.

For each downlink SL PRS resource configured, r(m) is scaled with a factor $\beta_{PRS}$ and mapped to resource elements $(k,l)_{p,u}$ according to below mentioned equation 3:

$$\alpha_{k,}^{(p,\mu)} = \beta_{prs} r(m)$$

where m is a whole number, k and l is represented by below mentioned equation 4 and equation 5 respectively:

$$k = mN + \left(\left(k_{offset}^{PRS} + k'\right) \bmod N\right) \quad \text{(equation 4)}$$

$$l = l_{start}^{PRS}, l_{start}^{PRS} + 1, l_{start}^{PRS} + 2, M - 1 \quad \text{(equation 5)}$$

where $$k_{offset}^{PRS}$$

is starting RE offset in the first OFDM symbol of each PRS resource in a PRS resource set, RE offsets (k') in the PRS OFDM symbols are given below Table 1 and N comb size.

TABLE 1

| | SL-PRS symbols (M) | | | | | | | | | |
|---|---|---|---|---|---|---|---|---|---|---|
| k-comb (N) | 0 | 1 | 2 | 3 | 4 | 5 | 6 | 7 | 8 | 9 |
| 1 | 0 | 0 | 0 | 0 | 0 | 0 | 0 | 0 | 0 | 0 |
| 2 | 0 | 1 | 0 | 1 | 0 | 1 | 0 | 1 | 0 | 1 |
| 4 | 0 | 2 | 1 | 3 | 0 | 2 | 1 | 3 | 0 | 2 |
| 6 | 0 | 3 | 1 | 4 | 2 | 5 | 0 | 3 | 1 | 4 |

SL PRS support SCS values for SL PRS include 15 kHz, 30 kHz, 60 kHz for FR1, and 60 kHz and 120 kHz for FR2.

A SL PRS resource refers to a time-frequency resource within a slot of a dedicated SL PRS resource pool that is used for SL PRS transmission. The SL PRS resource may include at least SL PRS resource ID, SL PRS comb offset and associated SL PRS comb size (N), SL PRS starting symbol and number of SL PRS symbols (M), SL PRS frequency domain allocation. The SL PRS resource is identified by a SL PRS resource Identifier (ID) that is unique within a slot of a dedicated SL PRS resource pool. For shared resource pools, the UE does not map SL-PRS and PSSCH DMRS in the same OFDM symbol(s). For a dedicated resource pool, at least the case where SL PRS bandwidth is same as resource pool bandwidth is supported. For a shared resource pool, SL PRS bandwidth is same as the bandwidth indicated for PSSCH.

Comb-based multiplexing of SL PRS from different UEs in a slot may be supported for at least for dedicated resource pools. For comb-based multiplexing of SL PRS from different UEs, support of at least the case wherein a single (M, N) value may be possible. TDM-based multiplexing in the slot of SL PRS from different UEs may not be supported for a shared resource pool. Comb-based multiplexing of SL PRS resources from different UEs in a slot may not be supported for shared resource pools. TDM-ed SL PRS resources within a slot from a single UE in a dedicated or shared resource pool may not be supported in Rel-18. Multiple (M, N) pairs within a slot in the dedicated resource pool may be supported only when the different (M, N) pairs are always multiplexed via TDM to different sets of symbols in the slot. Only a single (M, N) value may be mapped within one TDM duration (i.e. one set of symbols).

Figure 5:
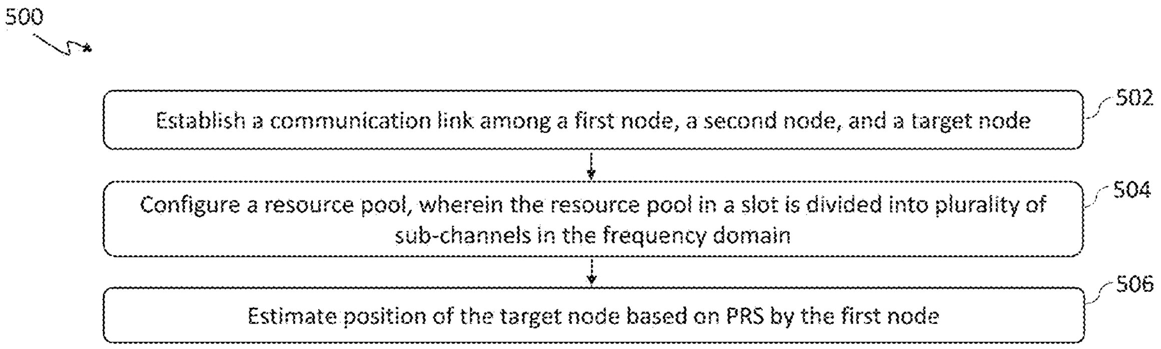
FIG. 5 illustrates a method of designing the PRS for side-link communication system, in accordance with an embodiment of the present invention.

FIG. 5 illustrates a method of designing the PRS for side-link communication system, in accordance with an embodiment of the present invention. The anchor UE may establish a communication link among the target UE 102-4 and the assisting UEs 102-1 to 102-3, for positioning the at least one target UE 102-4, at step 502. An at least one PRS may be configured in a side-link positioning resource pool divided into multiple sub-channels, at step 504. The resource pool may be dedicated for the sidelink positioning purpose or the legacy resource pool for sidelink communication may be shared for the sidelink positioning purpose. The at least one first sub-channel of the multiple sub-channels may be configured for the PRS, at least one second sub-channel of the multiple sub-channels may be configured for a data signal, and at least one third sub-channel of the multiple sub-channels may be configured for a Sidelink Control Information (SCI). The data signal may comprise at least one of PRS configuration resource sets, reporting configurations, assisting information, a trigger for positioning measurements, measurement reporting, and capability sharing. The at least one Sidelink Control Information (SCI) may be associated with at least one of the at least one PRS and data signal transmitted in the at least one sub-channel in the slot, at least one feedback channel, at least one Automatic Gain Control (AGC) symbol, and at least one time gap symbol. The anchor UE may estimate position of the at least one target UE 102-4 based on the at least one PRS, at step 506.

The dedicated resource pool for sidelink positioning purpose may be divided into sub-channels in the frequency domain. The sub-channels may be consecutive non-overlapping sets of 'N' resource blocks. 'N' may depend on available bandwidth and required accuracy in the positioning method. A higher layer parameter may provide the start of the resource pool, number of consecutive RBs in the pool, number of sub-channels in the resource pool, and size of the sub-channel. Higher layer may be UE's own higher layer or may be configured by higher layer of another UE in the communication network. In another embodiment, higher layer message may be configured by gNB to which UE may be connected directly or indirectly. A sub-channel 'm' may consist of n_subchannelsize contiguous resource blocks with Physical Resource Block (PRB) number. The PRB number may be determined by below mentioned Equation 6.

$$n\_prb = n\_\text{subchannelStart} + m * n\_\text{subchannelSize} + j \qquad \text{(equation 6)}$$

In equation 6, n_subchannelStart and n_subchannelSize are provided by higher layer parameters set by the communication network or preconfigured in the system and j takes value from 0 to n_subchannelSize−1.

After configuration of the dedicated resource pool, the UE 102 may monitor the positioning messages, including the PRS sequence over the dedicated resource pool. In time domain, configuration of the dedicated resource pool may be provided in terms of slot, symbol, or frame over predefined time 'T'. The slot within the predefined time may be provided by a bit map equal to a number of sub-channel across time within the duration of 'T.' A higher layer parameter may provide start of the side-link positioning resource pool, number of consecutive RBs in the side-link positioning resource pool, number of channels in the side-link positioning resource pool, and size of each sub-channel.

Figure 6:
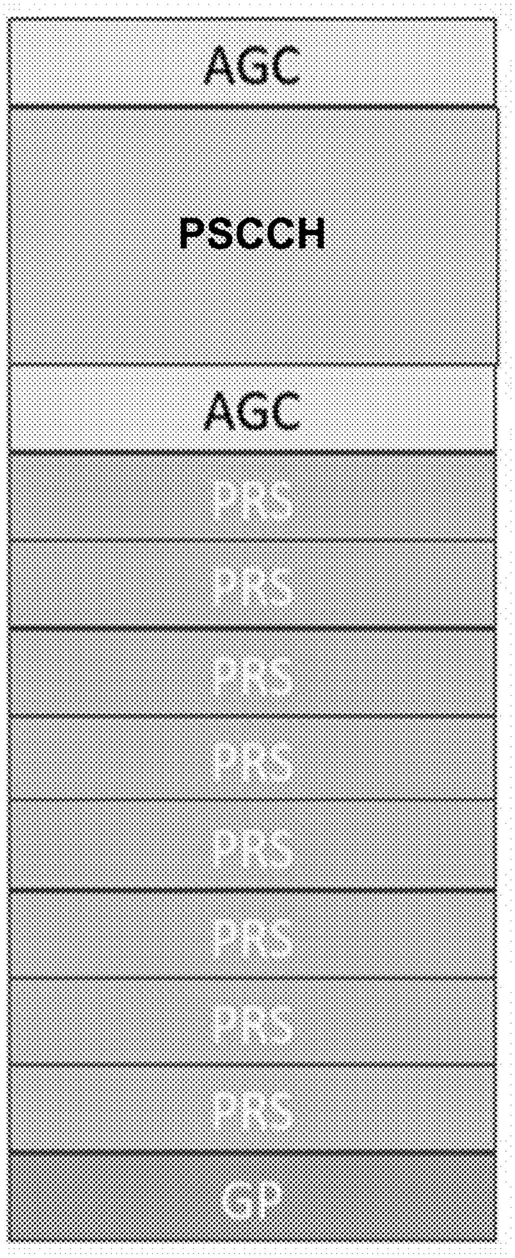
FIG. 6 illustrates a slot structure of the resource pool with PSCCH and PRS resource, in accordance with an embodiment of the present invention.

In the dedicated resource pool for SL positioning purpose, at least one of at least one PRS, the PSSCH, and the PSCCH may be multiplexed in a slot structure. FIG. 6 illustrates a slot structure of the resource pool with PSCCH and PRS resource, in accordance with an embodiment of the present invention. The slot structure may have AGC as a first symbol for controlling gain of a receiver. Symbols following the AGC may be used for the reception of the control channel, for example, the PSSCH channel. The PSSCH channel may include at least the first stage sidelink control channel and demodulation reference signals. One or more symbols configured to the UEs 102 may be used for control channel. If positioning measurements are to be performed by a UE from a different UE than the UE from which it receives the control information, a second AGC symbol may follow the control channel. Post the second AGC symbols, few symbols may contain a PRS sequence transmitted to perform positioning measurements.

In the dedicated resource pool, the SL PRS resource may be immediately preceded by an AGC symbol. In another way, if more than one PRS is multiplexed within a same slot from different UEs every SL PRS may be preceded with the AGC symbol. In another case if more than one PRS is multiplexed by same UE, then only one AGC symbol may be preceded to the first SLPRS in the slot. In another way if the slot containing PSCCH carrying first stage SCI and more than one SLPRS indicated by the first stage SCI, then only one AGC symbol may be used at the beginning of the slot. The PSCCH may be configured in at least one of one OFDM symbol, two OFDM symbols, and three OFDM symbols. The PSCCH may also be configured by higher layer including one of MAC-CE, RRC and pre-configuration. Frequency domain resource of the PSCCH is configured by higher layer including one of MAC-CE, RRC and pre-configuration where the frequency domain resource includes one of 10 resource blocks (RBs), 12 RBs, 15 RBs, 29 RBs, 25 RBs, 30 RBs, 40 RBs, 50 RBs and preconfigured RBs less than resource pool bandwidth.

If the PRS is to be received from a different UE, then the control information may provide the timing synchronization information to a receiving UE for proper reception of the PRS. The last symbol may be a Guard Period (GP) to switch the UE from receiver to transmitter. Similarly, if the slot contains feedback channel or a SL PRS measurement reporting channel then these channel may be preceded by the GP in terms of at least one symbol.

Figure 7:
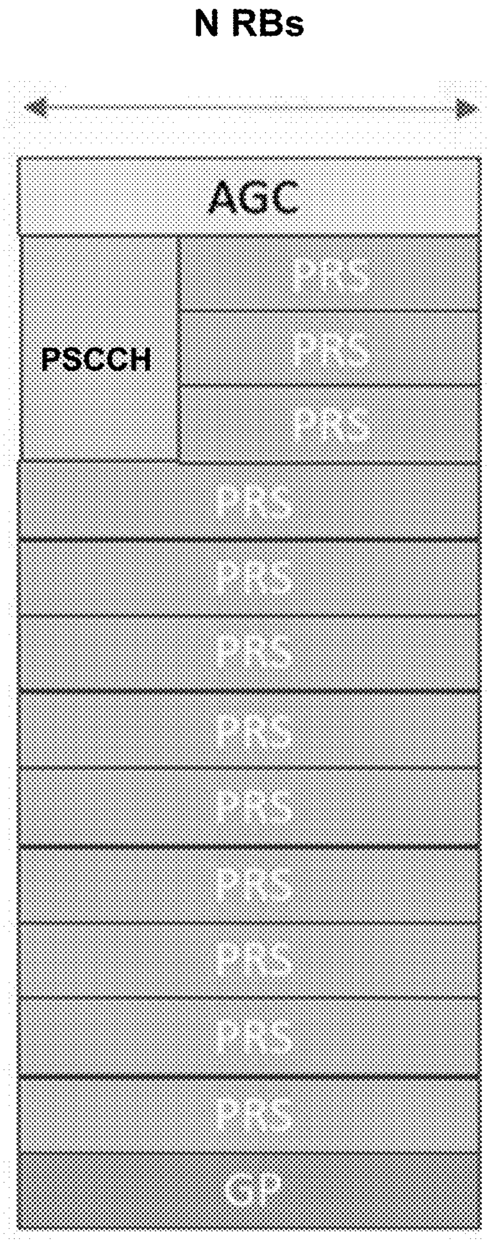
FIG. 7 illustrates a slot structure of the resource pool with PSCCH as few RB used within symbol used for transmission of Sidelink Control Information (SCI), in accordance with an embodiment of the present invention.

FIG. 7 illustrates a slot structure of the resource pool with PSCCH as few RB used within symbol used for transmission of Sidelink Control Information (SCI), in accordance with an embodiment of the present invention. As illustrated in FIG. 7, in the slot structure, the control information may be allocated over a few RBs of first few symbols, for example, first three symbols. PSCCH RB may start from the 0th RB of a subchannel to the first RB of PRS or data RB in the symbol.

Figure 8:
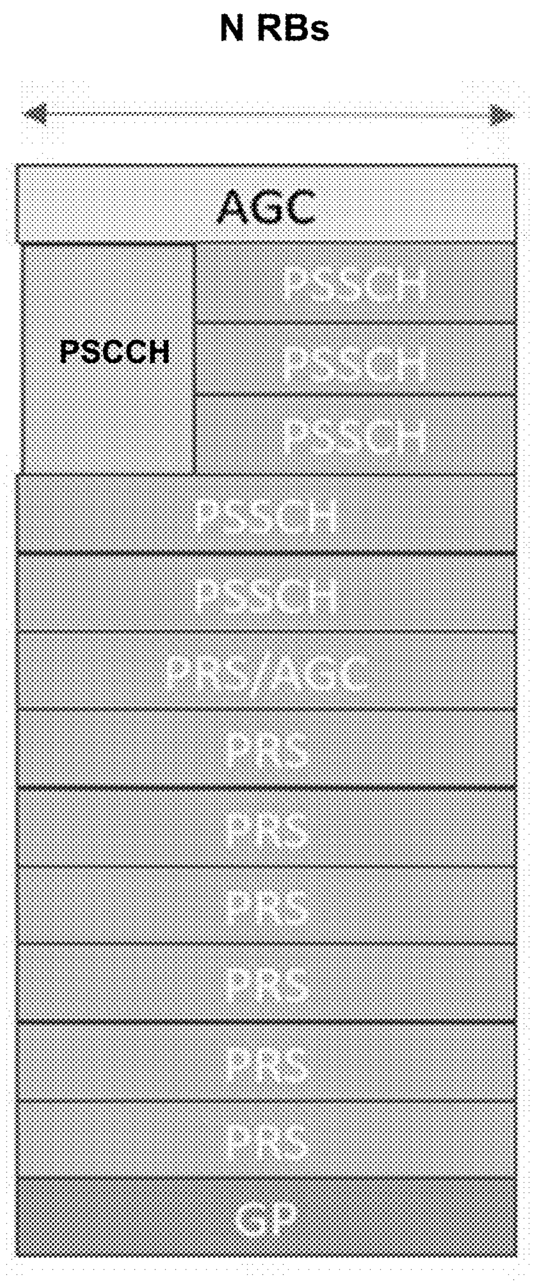
FIG. 8 illustrates a slot structure of the resource pool with multiplexing of the PSCCH and PRS and PSSCH channel in the slot, in accordance with an embodiment of the present invention.

FIG. 8 illustrates a slot structure of the resource pool with multiplexing of the PSCCH and PRS and PSSCH channel in the slot, in accordance with an embodiment of the present invention. The PSSCH may be used for reporting assisting information, positioning resource configuration, and second-stage SCI. Further, the PSCCH and the PSSCH may be multiplexed in the frequency domain.

Figure 9:
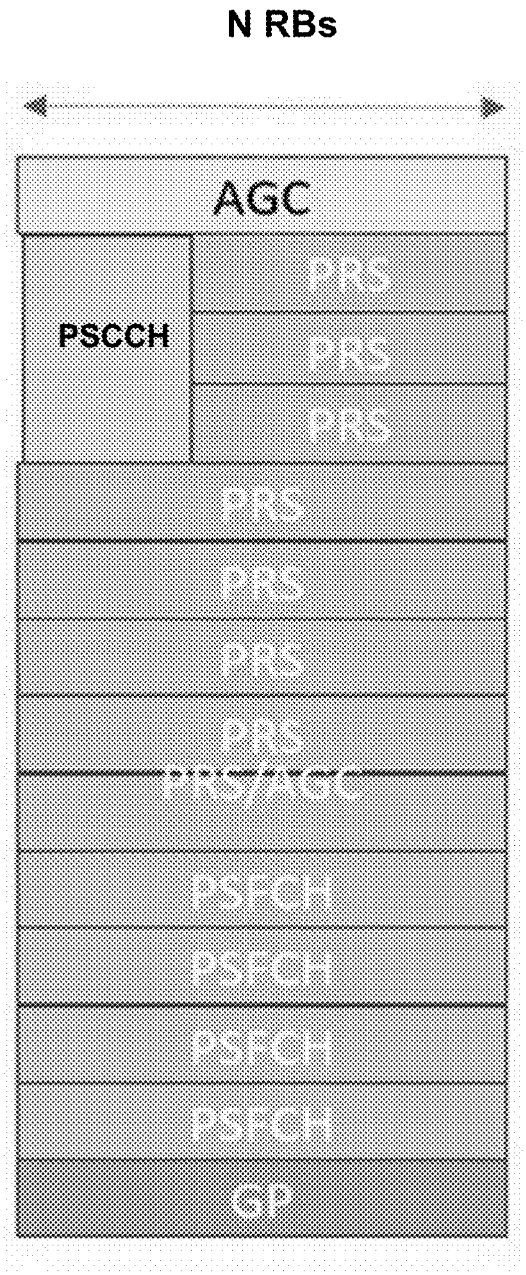
FIG. 9 illustrates a slot structure of the resource pool with multiplexing of the PSCCH and PRS and PSSCH channel in the slot for SCI transmission, in accordance with an embodiment of the present invention.

FIG. 9 illustrates a slot structure of the resource pool with multiplexing of the PSCCH and PRS and PSSCH channel in the slot for SCI transmission, in accordance with an embodiment of the present invention. As illustrated in FIG. 9, the PSCCH may use fewer RBs used within the symbol used for SCI transmission. A Physical Sidelink Feedback Channel (PSFCH) may be used to report the measurements associated with the PRS. The PSFCH may be similar to PSSCH. Further, the Guard Period (GP) may be provided before PSFCH for switching receiver to transmitter. Further, PSCCH and PRS may be multiplexed in the frequency domain.

In another implementation, if a legacy resource pool is utilised, then the subchannels may be shared among the SL-PRS resources and the PSSCH resources carrying SL-SCH PDU and second stage SCI of legacy sidelink transmission as well as carrying SL positioning message. The resource pool divided into subchannels in the frequency domain may be consecutive non-overlapping sets of 'N' resource blocks. 'N' will depend on available bandwidth and required accuracy in the positioning method chosen. The higher layer parameter will provide the start of the resource pool, number of consecutive RBs in the pool, number of channels in the resource pool, and size of the subchannel. The subchannel 'm' consists of n_subchannelsize contiguous resource blocks with Physical Resource Block number (PRB). The PRB number may be determined by below mentioned Equation 7:

$$n\_prb = n\_\text{subchannelStart} + m * n\_\text{subchannelSize} + j \quad \text{(equation 7)}$$

In equation 3, n_subchannelStart and n_subchannelSize are given by higher layer parameters set by network or preconfigured in the system.

Figure 10:
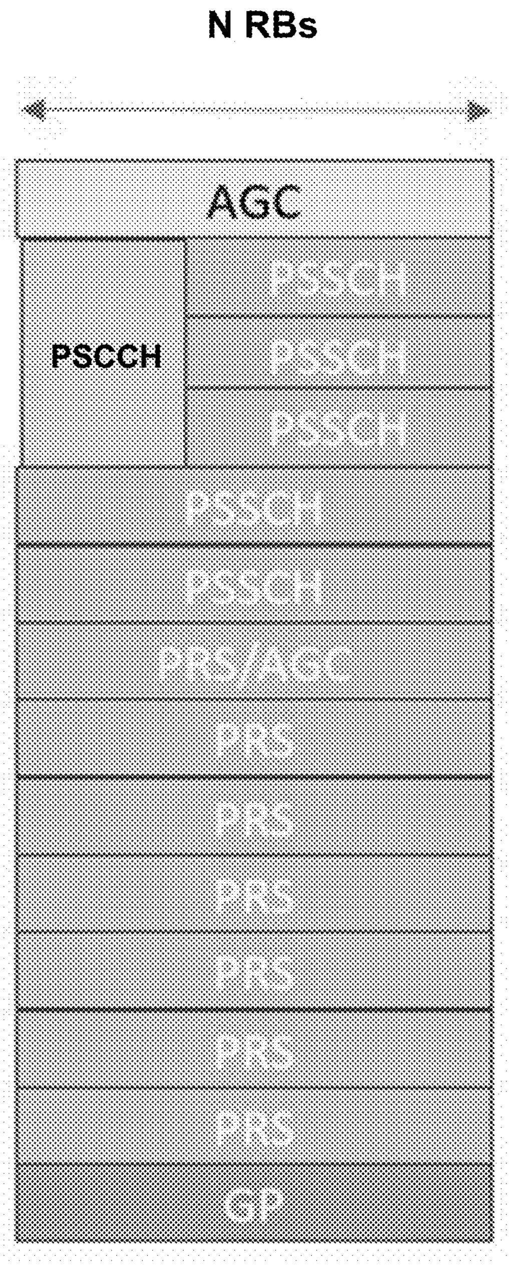
FIG. 10 illustrates a slot structure as per legacy sidelink resource pool, in accordance with an embodiment of the present invention.

FIG. 10 illustrates a slot structure as per legacy sidelink resource pool, in accordance with an embodiment of the present invention. Few symbols in the legacy resource pool may be reserved for SL-PRS. The symbols reserved for SL-PRS may be indicated in the first SCI using reserved bits. The subchannel selection procedure may be similar to the dedicated resource pool case. The only difference between the subchannel selection for the dedicated resource pool and the shared resource pool may be that the bandwidth chosen may limit the bandwidth of the SL-PRS for sidelink PSSCH operation. To overcome this in a shared resource pool, a UE can select more than one subchannel adjacent to each other in frequency to aggregate the bandwidth of SL-PRS. Furthermore, the receiver UE may be indicated to process it simultaneously for PRS measurements. This will be indicated in the resource allocation configuration message to each assisting or target UE from either target UE, assisting UE, or positioning server, depending on direction. The legacy slot structure should be introduced with an additional AGC symbol if the source for transmission of SL-PRS and PSSCH in the slot is different.

In another implementation, for signaling the PRS configurations, the control channel PSCCH may be designed. The PSSCH may carry one second stage SCI indicating PSSCH and SL-PRS, and at least two second stage SCIs concatenated together for PSSCH and at least one SL-PRS separately. The PSCCH may comprise a first stage SCI and PSCCH Demodulation Reference Signal (DMRS). The first stage SCI may be used mainly for broadcasting of resource busy status of the sub channel. The first stage SCI may be used mainly in UE autonomous mode resource selection. Along with this, the first stage SCI may provide one or more of time and frequency resource allocation of PRS and/or PSSCH, Modulation and Coding Scheme (MC S) for PSSCH, priority of associated PSSCH, resource reservation period, time pattern for PSSCH DMRS, size and format of the second stage SCI, and at least one PRS resource trigger, PRS presence indicator, PSSCH presence indicator, PRS report trigger, source ID, destination ID, cast type. The PRS resource ID may be indicated using at least one of bit map equal to number of PRS resource IDs and binary encoded format.

Further, the first stage SCI may comprise resource configuration information for at least one PRS and the PSSCH. The first stage SCI may provide possible PRS locations for all possible PRS configurations in the slot. Exact location of the PRS may be provided by the PRS resource configuration. The PRS resource trigger may be included in the first stage SCI or in a second stage SCI. At least one guard symbol is configured in between pair of PRS resources when the slot contains at least two PRS resources. The at least one pair of PRS resources are configured in opposite direction.

The first stage SCI may indicate that the resource allocation is for SL-PRS and/or PSSCH. A New first stage SCI may be developed for the dedicated and the shared resource pool providing information about SLPRS and/or PSSCH. In another implementation, the first stage SCI may be reused. Presence of SL-PRS and PSSCH in the allocation may be indicated by reserved bits of the first stage SCI. Time and frequency resource values may be absent if no PSSCH is present in the slot. The additional bit will indicate the resource set of PRS configured to UE if both are present.

The PSSCH may be utilized for reporting assisting information, positioning resource configuration, and second-stage SCI. In another implementation, for designing the PRS, the data channel PSSCH may be designed with the second stage SCI. The second stage SCI may carry the resource configuration and reporting configuration trigger along with the HARQ for PSSCH if PSSCH is present in the slot. After channel coding and rate matching, the second stage SCI may be padded with a coded bit of SL-SCH. Size of the second stage SCI may be provided by the first stage SCI.

The second stage SCI may comprise HARQ process ID, new data indicator and redundancy version, source ID and destination ID, HARQ enabled/disabled indicator, PRS resource trigger, and PRS reporting trigger, at least one PRS Resource ID, PRS resource configuration, PRS priority, LCS session ID, HARQ enabled/disabled indicator associated with the PSSCH, configuration, PRS resource trigger ID and reporting configuration trigger, and PRS reporting trigger. The PSSCH may comprise a Side-link Shared Channel (SL-SCH) coming from the higher layer carrying the positioning server messages from the higher layer, including assisting data, resource configuration sets, reporting sets, and positioning measurement triggers. The PSSCH received may or may not be associated with the PRS received in the same slot.

In one implementation, configuration of the resource pool utilized for positioning, may be indicated to the UEs 102 over the sidelink. The indication may be provided using one of Mode 1 resource allocation and Mode 2 resource allocation. The UE may be configured to perform either resource allocation in Mode 1 or Mode 2, applicable to all the resource pools (dedicated or shared resource pools). SL PRS unicast, groupcast, and broadcast may occur in either the shared or the dedicated resource pool.

Mode 1 resource allocation may be a network assisted mode where network 100 may configure the resource pools to the UEs 102 taking part in positioning in the network 100. In scenario of partial coverage when the target UE 102-4 may be out of network coverage but may connect to the BS via a UE relay, the anchor UE or the reference node 102-6 may provide the list of assisting UEs 102-1 to 102-3 to the connected BS or positioning server in the network 100. The positioning server may provide this information to the BS connected. Further, the BS may configure each assisting UEs 102-1 to 102-3 with PRS resources. For Mode 1 SL-PRS resource allocation, a transmitting UE may receive the SL-PRS resource allocation signalling from gNB through a dynamic grant, configured grant type 1 and configured grant type 2.

The BS may provide same information to the positioning server as well to indicate mapping of PRS resources with the assisting UEs 102-1 to 102-3. The assisting UEs 102-1 to 102-3 may send the PRS sequence in the configured resources or receive the PRS resource from the target node 102-4, depending upon the direction chosen for PRS transmission in the configuration of resource pool. For SL-PRS transmission, at least support the SL-PRS transmissions with periodic reservation and without periodic reservation. Measurements may be more than one, and the positioning measurement configuration signal may configured by the higher layer and may be triggered by the lower layer.

In another embodiment, the positioning server may ask the BS for the PRS resources and configure the PRS resources to the assisting UEs 102-1 to 102-3 as a location protocol message. A dedicated message for the location protocol may be sent from the positioning server to the assisting UEs 102-1 to 102-3. The assisting UEs 102-1 to 102-3 may send/transmit the PRS sequence in the configured resource or receive the PRS resource from the target node 102-4, depending upon direction chosen for PRS transmission in the configuration of resource pool. Measurements can be more than one, as indicated by the positioning measurement configuration signal configured by the higher layer and may be triggered by the lower layer.

The subchannel chosen may be shared across a few UEs of the assisting UEs 102-1 to 102-3, but the PRS resource configuration may be different. Therefore, more than one assisting UEs 102-1 to 102-3 may be assigned to receive the same sub-channel but may differ in either sequence of PRS being orthogonal across multiplex assisting UEs or use different comb structures or use of orthogonal code cover.

Mode 2 resource allocation may be performed by UEs 102 in the network 100 by coordination between the UEs by sensing channel as the BS is not there in the network. In scenario of out of coverage when the target UE 102-4 may be out of network coverage, the UEs in network 100 may have to locate SL-PRS resources. The UEs 102 may sense if the slot is available. If the slot is available, the slot may be selected. The UEs 102 may perform sensing using PSCCH DMRS and PRS. The UE 102 may the at least one subchannel using at least one of the PRS resource, first stage SCI, second stage SCI, and the PSCCH DMRS. The first stage SCI may provide the knowledge of occupancy of the sub-channels. A subset of subchannels may be selected for SL-PRS transmission using selected subchannels in the sensing stage. In Mode 2, UE may randomly select the resources for SL PRS from the set of configured resources. A sensing based selection or the random selection of SL PRS resources in Mode 2 may be configured as (pre-) configured per resource pool. The sensing-based selection and random selection may be allowed in the same resource pool. For Mode 2 type of SL-PRS resource allocation, congestion control mechanisms using existing congestion control mechanisms may be specified as a starting point.

When more than one anchor UEs may be involved in the positioning of the target UE 102-4, then either the network 100 may configure the PRS resources for each UE and communicate individually to each of the assisting UEs 102-1 to 102-3 or convey the list to one of the assisting UEs 102-1 to 102-3 via the reference UE 102-6 or the anchor UE. The reference UE 102-6 or the anchor UE may further configure the PRS resources to the other assisting UEs 102-1 to 102-3 including target UE 102-4.

In one implementation, the reference UE 102-6 or the anchor UE may select the PRS resource in mode 2 and may select the PRS resources for all the anchor UEs. Further, the PRS resources may be configured individually for each anchor UE and the target node 102-6. In another implementation, the target UE 102-6 may select the resource autonomously using mode 2 resource allocation, and then choose an available subchannel. The subchannel may be provided to the positioning server for configuring to each of the assisting UEs 102-1 to 102-3. In yet another implementation, the target UE 102-6 may select the resource autonomously using mode 2 resource allocation, and then choose an available subchannel. The subchannel may be provided to each of the assisting UEs 102-1 to 102-3. The subchannel may also be provided to the positioning server.

Signalling for the PRS resource configuration may occur over PSSCH. The PSSCH channels may be transmitted either in the SL-PRS dedicated resource pool or the legacy PSSCH resource pool. The selected resource pool may be transmitted to each of the assisting UEs 102-1 to 102-3 or target UE 102-6 in unicast or broadcast message. Transmitter UE may maintain orthogonality between the resources selected for each anchor UE. If the transmitter UE may send a broadcast message, a UE ID may be maintained along with associated resource/s configured to each UE ID. The UE IDs may uniquely identify each anchor node. Direction of transmission over the subchannel may depend on the positioning method and the direction of the anchor node configured for each UE 102 in the network 100.

The subchannel may be multiplexed in time, frequency or code. In one implementation, the subchannel may be configured to all the anchor UEs but at a different time stamp. In another implementation, subchannels may be configured to different subchannels. If the time stamp and subchannel are the same, then a different sequence may be used to distinguish SL-PRS resources.

Upon reception of the PRS by the UEs 102, the UEs 102 are expected to perform a predefined measurement based on a configured positioning method. The UE 102 perform additional measurements supporting the measurements of the position of the target node 102-4. The additional measurements may include measurement on a first path, measurement on an additional path, path powers, LOS/NLOS indication, and angle of arrival per path. Once the additional measurements are performed, a receiver UE may report it back to a concerned node, for example the positioning server, in the network 100, for position estimation. In mode 2 resource allocation for positioning, the UEs may be configured with reporting configuration associated with one or more PRS resource configurations. The configurations may convey the positioning measurement to one or more of the LMF, the anchor node, and the assisting UEs 102-1 to 102-3. The positioning measurements may be reported by the dedicated PRS resource pool or the legacy PSSCH resource pool. The UE receiving the resource pool may choose same subchannel for measurement reporting if a feedback channel is available in the same slot. If a feedback channel is not available in the same slot, the UE may send the measurement report in the PSSCH channel over another subchannel. The slot may be chosen by the UE receiving the resource pool on its own or provided by the LMF and the anchor node, to the receiver UE for reporting the positioning measurements. The measurement report may be sent in a Medium Access Control-Control Element (MAC-CE) packet, Sidelink-Radio Resource Control (SL-RRC) packet, or positioning protocol packet.

In the above detailed description, reference is made to the accompanying drawings that form a part thereof, and illustrate the best mode presently contemplated for carrying out the invention. However, such description should not be considered as any limitation of scope of the present invention. The structure thus conceived in the present description is susceptible of numerous modifications and variations, all the details may furthermore be replaced with elements having technical equivalence.

We claim:

1. A method of positioning a target node in a side-link communication system, the method comprising:
- establishing, by at least one first node, a communication link with at least one second node and at least one third node;
- measuring, by the at least one first node, a relative Angle of Arrival (AoA) and a relative Angle of Departure (AoD) of the at least one third node with respect to the at least one second node, wherein the target node is one of the at least one first node, the at least one second node and the at least one third node, and
- estimating, by the at least one first node, a position of the at least one target node based on at least one of a data related to at least one positioning measurement, the relative AoA, and the relative AoD.

2. The method as claimed in claim 1, wherein the relative AoA and the relative AoD is measured using the data related to at least one positioning measurement.

3. The method as claimed in claim 1, further comprises receiving, by the at least one first node from at least one of the at least one second node and the at least one third node, the data related to at least one positioning measurement, wherein the data related to at least one positioning measurement is at least one of Time of Arrival (ToA), Time Difference of Arrival (TDoA), Reference Time of Arrival (RToA), Rx-Tx time difference, Reference signal Time Difference of Arrival (RTDoA), Reference Signal Carrier Phase (RSCP), Reference signal Carrier Phase Difference (RSCPD), Reference Signal Time (RST) per path, Received Signal Strength (RSRP) per path, Line of Sight (LoS) probability, and a timestamp corresponding to at least one of positioning measurements, relative synchronization time difference, synchronization source, AOA, and AoD.

4. The method as claimed in claim 3, further comprises reporting the data related to at least one positioning measurement by at least one of the at least one second node and the at least one third node.

5. The method as claimed in claim 4, wherein the data related to at least one positioning measurement, is determined by the at least one second node, using at least one Positioning Reference Signal (PRS) received from at least one of the at least one first node and the at least one third node.

6. The method as claimed in claim 4, wherein the data related to at least one positioning measurement, is determined by the at least one third node, using at least one PRS received from at least one of the at least one first node and the at least one second node.

7. The method as claimed in claim 1, further comprises obtaining, by the at least one first node, the data related to at least one positioning measurement, wherein the data related to at least one positioning measurement is at least one of Time of Arrival (ToA), Time Difference of Arrival (TDoA), Reference time of arrival (RToA), Rx-Tx time difference, Reference Signal Time Difference of Arrival (RTDoA), Reference Signal Carrier Phase (RSCP), Reference Signal Carrier Phase Difference (RSCPD), Reference Signal Time (RST) per path, Received Signal Strength (RSRP) per path, Line of Sight (LoS) probability, a timestamp corresponding to at least one of positioning measurements, relative synchronization time difference, synchronization source, AOA, and AoD.

8. The method as claimed in claim 7, wherein the data related to at least one positioning measurement, is obtained by the at least one first node, using at least one PRS received from at least one of the at least one second node and the at least one third node.

9. The method as claimed in claim 5, wherein the at least one PRS is transmitted by at least one of the at least one first node and the at least one third node orthogonally in at least one of time, frequency, code, and space.

10. The method as claimed in claim 6, wherein the at least one PRS is transmitted by at least one of the at least one first node and the at least one second node orthogonally in at least one of time, frequency, code, and space.

11. The method as claimed in claim 8, wherein the at least one PRS is transmitted by at least one of the at least one second node and the at least one third node orthogonally in at least one of time, frequency, code, and space.

12. The method as claimed in claim 1, wherein the position of the at least one target node is estimated with respect to at least one of reference location.

13. The method as claimed in claim 12, wherein the at least one reference location is one of a global coordinate, the at least one of reference location of the at least one first node, the at least one second node, and the at least one third node.

14. The method as claimed in claim 1, further comprising transmitting, by the at least one first node, the position of the at least one target node to at least one side-link positioning server.

15. The method as claimed in claim 14, wherein the at least one side-link positioning server resides in at least one of the at least one first node, the at least one second node, the at least one third node, and a cellular network of the sidelink communication system.

16. The method as claimed in claim 14, further comprising:
- receiving, by the at least one side-link positioning server, the data related to the at least one position measurement of the at least one target node from at least one first node; and
- estimating, by the at least one side-link positioning server, the position of the at least one target node based on the data related to the at least one position measurement.

17. The method as claimed in claim 5, further comprising generating the at least one PRS, based on at least one of a sequence design, a frequency domain pattern, a time domain pattern, a time domain behavior, and supported bandwidth to minimize error in channel estimation due to fading in time and frequency due to doppler and multipath.

18. The method as claimed in claim 6, further comprising generating the at least one PRS, based on at least one of a sequence design, a frequency domain pattern, a time domain pattern, a time domain behavior, and supported bandwidth to minimize error in channel estimation due to fading in time and frequency due to doppler and multipath.

19. The method as claimed in claim 8, further comprising generating the at least one PRS, based on at least one of a sequence design, a frequency domain pattern, a time domain pattern, a time domain behavior, and supported bandwidth to minimize error in channel estimation due to fading in time and frequency due to doppler and multipath.

20. The method as claimed in claim 17, wherein the at least one PRS is generated using pseudo random gold sequence.

21. The method as claimed in claim 20, wherein the pseudo random gold sequence is initialized using at least one of a slot number, a symbol number, and a parameter $$n_{ID,seq}^{SL-PRS},$$

the parameter $$n_{ID,seq}^{SL-PRS},$$

is one of:

provided by a higher layer of a transmitting node, derived from 12 Least Significant Bits (LSBs) Cyclic Redundancy Check (CRC) of Physical Sidelink Control Channel (PSCCH) associated with the at least one PRS, and a combination of parameter provided by the higher layer of the transmitting node and 12 LSB bits CRC of PSCCH associated with the at least one PRS.

22. The method as claimed in claim 17, wherein the at least one PRS is configured in time-frequency resource in a slot using time domain pattern and frequency domain pattern.

23. The method as claimed in claim 17, wherein the frequency domain pattern includes comb size, resource element (RE) offset within resource blocks (RB), and wherein the RE offset is derived from initial offset and offset specific to at least one PRS symbol.

24. The method as claimed in claim 17, wherein the time domain pattern comprises at least one of a number of PRS symbols, and start of at least one PRS symbol in the slot.

* * * * *